United States Patent
Steiner

(10) Patent No.: US 6,767,485 B1
(45) Date of Patent: Jul. 27, 2004

(54) PROCESS FOR CONTROLLING MOLECULAR WEIGHT OF POLYMER

(75) Inventor: James L. Steiner, Salisbury, NC (US)

(73) Assignee: Arteva North America S.A.R.L., Zurich (CH)

(*) Notice: Subject to any disclaimer, the term of this patent is extended or adjusted under 35 U.S.C. 154(b) by 0 days.

(21) Appl. No.: 10/396,956

(22) Filed: Mar. 25, 2003

(51) Int. Cl.[7] .................... B29C 47/00; B29C 47/92; D01D 5/08; D01F 1/10; D01F 6/62
(52) U.S. Cl. ........................... 264/40.1; 264/211
(58) Field of Search .................. 264/40.1, 211

(56) References Cited

U.S. PATENT DOCUMENTS

| 4,359,557 A | | 11/1982 | Watkins et al. |
| 4,620,032 A | * | 10/1986 | Doerr ................ 562/483 |
| 5,308,892 A | | 5/1994 | Zickler et al. |

FOREIGN PATENT DOCUMENTS

JP      49-1256 A     1/1974

* cited by examiner

Primary Examiner—Leo B. Tentoni
(74) Attorney, Agent, or Firm—Gregory N. Clements

(57) ABSTRACT

The present invention relates to a process for making a lower molecular weight polymer from a solid stated higher molecular weight feed stock chip. In particular, the molecular weight of an industrial resin or a bottle resin is reduced in a controlled manner by the introduction of ethylene glycol. If the industrial resin is to be employed for industrial fibers, the ethylene glycol may be added at the extruder for spinning the industrial fiber. On the other hand, should the high molecular weigh chip be used for bottle resin, the molecular weight may be reduced by the introduction of ethylene glycol at the extruder for injection molding of preforms of a lower molecular weight. The ethylene glycol/polymer ratio is determined by the reduction in molecular weight that is required. The preferred resin is polyester polymer or copolymer, and especially polyethylene terephthalate (PET). The present invention comprises a process for reducing the molecular weight of a solid stated polyester feed stock resin comprising obtaining polyester resin having an IV greater than about 0.8 dl/g; and mixing ethylene glycol with said polyester wherein said ethylene glycol is present in a stoichiometric amount to reduce the IV to the required level.

13 Claims, No Drawings

PROCESS FOR CONTROLLING MOLECULAR WEIGHT OF POLYMER

BACKGROUND OF THE INVENTION

1) Field of the Invention

The present invention relates to a process for making a lower molecular weight polymer from a solid stated higher molecular weight feed stock chip. In particular, the present invention relates to a process, wherein the molecular weight of an industrial resin or a bottle resin is reduced in a controlled manner by the introduction of ethylene glycol. More specifically, the ethylene glycol may be introduced in an extruder. If the industrial resin is to be employed for industrial fibers, the ethylene glycol may be added at the extruder for spinning the industrial fiber. On the other hand, should the high molecular weigh chip be used for bottle resin, the molecular weight may be reduced by the introduction of ethylene glycol at the extruder for injection molding of preforms of a lower molecular weight. The ethylene glycol/polymer ratio is determined by the reduction in molecular weight that is required. The preferred resin is polyester polymer or copolymer, and especially polyethylene terephthalate (PET).

2) Prior Art

Polyester chip is generally employed to make containers, such as soft drink bottles; film for multiple uses including food wrap, for example; molded parts for appliances or the automotive industry, for example; and fiber for the textile or industrial uses. Of the many uses for polyester chip, containers and industrial fibers require a high molecular weight chip. Primarily the high molecular weight is obtained by running polyester chip through a solid state polymerizer to increase its molecular weight.

In the fiber making art, low molecular weight chip may be used to make textile products. Textile products do not require the high tensile strength and increased physical properties required for industrial fiber uses. Typical industrial fiber uses include seat belts, airbags, tire cord, and other reinforcement for conveyor belts, hoses, and v-belts, for example.

The normal process used for high molecular weight chip is to solid state polymerize chips from the melt phase polymerization process of a lower molecular weight. Often, a production line that is capable of producing high molecular weight chip can also be reconfigured to make a lower molecular weight chip. However, it is necessary to interrupt production to either decouple the solid-state polymerization, or change the solid state polymerization process conditions in order to make the lower molecular weight chip. Switching the process in a production line from a high molecular weight chip to a lower molecular weight chip and vice-versa is not only timely but also costly. Therefore it would be desirable to develop a process in which the line does not have to be stopped and reconfigured in order to make lower molecular weight chip. In particular, it would be especially desirable to produce the high molecular weight chip under constant conditions and to lower its molecular weight in a controlled and accurate fashion without modifying the production line to produce the required molecular weight of the product that is being manufactured.

In recycling efforts for polyester, it is known that polyester can be recycled by employing either a glycolysis process or a hydrolysis process. The hydrolysis process uses water or steam to break down the polyester into its monomers for recycle purposes. No further discussion of this process is necessary with respect to the present invention.

In a glycolysis recycle process, the polyester to be recycled is heated and subjected to a high temperature glycol stream which reverses the reaction of producing polyester and therefore produces monomers (the starting materials for making polyester) such that the monomers can then be reused to make polyester. Consequently, the addition of glycol to polyester, thereby producing a glycolysis reaction, is known in the industry.

It is also known in the industry to add glycol to polyester as a carrier for master batch operations. Master batch operations are generally employed when it is desirable to uniformly mix a small amount of an additive into a large amount of polymer, such as polyester. In order to obtain the necessary uniformity, a master batch containing, for example, 10% of an additive with the remainder being glycol, may be added to polyester to produce a final polyester composition having a half percent additive. In order to achieve good dispersion of the additive in the master batch, glycol is added during compounding the master batch. The molecular weight of the master batch is chosen to match the additive free polymer to achieve the desired molecular weight.

It is also known in the textile industry to add glycol to polyester resin to prevent pilling. Pilling occurs in a garment that contains synthetic fiber, such as polyester fiber. When a filament or two of polyester in the textile garment breaks, it tends to roll into a very small ball and produce an esthetically unpleasing garment. To avoid pilling, glycol is added to the polyester resin at spinning which results in a reduced or lower strength physical property fiber (yet this fiber still has physical properties superior to cotton, for example).

In summary, in prior art processes there are 3 situations where glycol is added to polyester, namely: 1) the recycle of polyester; 2) masterbatch operations, and 3) to reduce pilling in textile garments. In each of these situations the final molecular weight, expressed in terms of intrinsic viscosity (IV), of the polyester chip or polyester resin is below 0.7 and in most cases is between 0.4 and 0.6 IV. Polyester chips or resin having such a low IV would not be suitable for industrial applications requiring high molecular weight for good physical properties.

U.S. Pat. No. 5,308,892 to Zickler et al. discloses a polyester masterbatch which was produced with 0.01 to 5 moles of a diol (ethylene glycol) per mole of polyester. The initial IV of the polyester used for the master batch was at least 0.5 dl/g and it is reduced further by the addition of the ethylene glycol in the master batch process.

U.S. Pat. No. 4,359,557 to Watkins et al. discloses a process for manufacturing polyethylene terephthalate fibers having improved low pilling properties by add/mixing ethylene glycol with the polyethylene terephthalate in an extruder. The original polymer material has an IV of about 0.56 to about 0.60 with about 0.25% by weight ethylene glycol blended therewith. The resultant molecular weight is about 0.39 to about 0.43. Based on the weight of the polyester, this means that 2500 ppm of ethylene glycol was added to reduce the inherent molecular weight in claim 1, for example, from 0.56 to 0.40.

Japanese patent publication 49-1256 to Iwaki et al. discloses a method for making a low molecular weight polyester fiber having an improved pilling by mixing with the polyester ethylene glycol or propylene glycol. In each example, however, magnesium stearate was added as a necessary component to lower the molecular weight.

SUMMARY OF THE INVENTION

In the broadest sense, the present invention comprises a process for reducing the molecular weight of a solid stated polyester feed stock resin comprising obtaining polyester resin having an IV greater than about 0.8 dl/g; and mixing ethylene glycol with said polyester wherein said ethylene glycol is present in a stoichiometric amount to reduce the IV to the required level.

Furthermore, in the broadest sense of the present invention, said resin has color properties about the same as the polyester resin without the introduction of the ethylene glycol component.

In the broadest sense the present invention also comprises a method of reducing the IV of a solid stated polyester resin feed stock suitable for spinning comprising obtaining a polyester resin having an IV greater than about 0.8, introducing said polyester resin into an extruder for extruding/spinning resin into fiber, introducing ethylene glycol into said, extruder, and extruding/spinning said polyester resin to produce fibers having an IV lower than that obtained without the addition of ethylene glycol.

In the broadest sense the present invention also comprises a method of reducing the IV of a solid stated polyester resin feed stock suitable for injection molding comprising obtaining a polyester resin having an IV greater than about 0.8, introducing said polyester resin into an extruder for injection molding resin into an article (such as a preform for a plastic bottle), introducing ethylene glycol into said extruder, and extruding/injection molding said polyester resin to produce an article having an IV lower than that obtained without the addition of ethylene glycol.

In addition to the above, the present invention also has an IV standard deviation along the spin beam manifold in the range of less than about 0.01 in the process where the ethylene glycol and polyester are added at the throat of the extruder and mixed in the extruder prior to spinning into a fiber.

DESCRIPTION OF THE PREFERRED EMBODIMENTS

Polyethylene terephthalate is prepared by one of two processes, namely: 1) the DMT process and 2) the TA process. In the DMT process, dimethyl terephthalate (DMT) is reacted with ethylene glycol in an ester interchange reaction (transesterification) to yield bis (2-hydroxyethyl) terephthalate (monomer) and methanol. Because the reaction is reversible, it is necessary to remove the methanol to completely convert the raw materials into monomer. It is known to use magnesium and/or cobalt and/or zinc in the ester interchange reaction. The catalyst activity is then sequestered by introducing phosphorus, for example, in the form of polyphosphoric acid (PPA), at the end of the ester interchange reaction. The monomer then undergoes a condensation reaction (polycondensation) which polymerizes the monomer to PET. When the monomer undergoes polycondensation, the catalyst most frequently employed is antimony. If the catalyst employed in the ester interchange reaction is not arrested with phosphorus, the resultant polymer easily degrades (thermodegradation) and has a very unacceptable yellow color.

The second method for making PET is to react terephthalatic acid (TA) and ethylene glycol by a direct esterification reaction producing bis (2-hydroxy ethyl) terephthalate and oligomers and water. This reaction is also reversible and thus can be carried to completion by removing the water during the reaction. The direct esterification step does not require a catalyst and conventionally no catalyst is employed. Just as in the DMT process, the monomer then undergoes polycondensation to form PET. The polycondensation reaction typically uses antimony as a catalyst.

In the production of synthetic fiber, molten polyester resin with or without various additives is fed to a spinneret via an extruder. From the spinneret, many filaments are produced which are then drawn to provide an increase in physical properties and optionally may be relaxed, before wind up on bobbins. The extrusion temperature and pressure, along with the draw ratio, the amount of relax and the wind up speed are all known to those skilled in the art for producing industrial fibers. The molten polyester is generally produced from a high molecular weight (high IV) chip which has been solid state polymerized. The chip from the solid state polymerizer is then feed into an extruder which melts the chip and forces the molten polyester resin through the holes of the spinneret to produce fiber or filament.

In the production of polyester bottles, molten polyester resin in an extruder, with or without various additives, is fed to an injection molding machine to form a bottle preform. The bottle preform is then heated generally by means of infrared heating and blown in a mold into bottle. The bottle is typically used for soft drinks, beer or other alcoholic beverages, and for mineral water.

The extruder employed with the present invention possesses an end-like opening at its throat to permit the introduction of additives and particularly with respect to the present invention, ethylene glycol.

With respect to the present invention, polyester chip, which has been solid state polymerized to a high molecular weight (at least 0.80 IV) is introduced into the extruder along with ethylene glycol (typically between about 0.0001 and about 0.001 ethylene glycol/polyester ratio) to reduce the molecular weight (reduce the IV) compared with extruded polyester resin which contains no ethylene glycol. As the chip becomes molten, the ethylene glycol uniformly mixes with it and results in a decrease in IV. There was no detectable odor of degradation, nor was degradation visibly apparent, nor does test data indicate any degradation.

Test Procedure

The relative viscosity (RV) of a 3% solution of the polymer in orthochlorophenol was measured at 25° C. using an Ubbelhode viscometer. The intrinsic viscosity (IV was calculated from the following relationship:

$$RV = 1 + IV \times C + 0.305 \times IV^2 \times C^2 + 1.85 \times 10^{-5} \times \exp^{(4.5 \cdot IV)} \times C^4$$

where C is the concentration in grams per 100 milliliters.

The carboxyl end groups (CEG) value of the polymer is determined by dissolving a sample in reagent grade benzyl alcohol and titrating to the purple end point of phenol Red indicator with 0.03 N sodium hydroxide/benzyl alcohol solution. The results are reported as milliequivalents sodium hydroxide per kilogram of the sample.

Color was measured with a Hunter ColorQuest II instrument using D65 illuminant, 2° observer, and reported as 1976 CEI values of color and brightness, L, a*, and b*.

EXAMPLE 1

A single position industrial spin-draw machine was used with a chip rate for the trial of 47.7 kg/hr, with normal extruder, manifold and dow box temperatures. Two packs were installed to check spinning characteristics and to check the uniformity of the polymer from each pack. Table 1 shows the various trial cells, including the injection rate, ethylene glycol/polymer ratio, and the measured results, IV, CEG, and color.

TABLE 1

| Trial Cell | Glycol/polymer ratio | Pack Polymer Temp, °C. | IV | CEG | b*/L* |
|---|---|---|---|---|---|
| Chip |  |  | 0.955 | 13.3 |  |
| 1 | 0 | 318.0 | 0.876 | 17.1 | 3.27/88.4 |
| 2 | 0.00033 | 311.5 | 0.812 | 17.8 |  |
| 3 | 0.00052 | 308.8 | 0.790 | 18.3 |  |
| 4 | 0.00075 | 306.2 | 0.747 | 16.3 | 3.10/89.1 |
| 5 | 0.00109 | 303.3 | 0.707 | 16.2 |  |
| 6 | 0.00138 | 301.0 | 0.656 | 17.5 |  |

The high polymer temperature from the high throughput resulted in a rather low IV from thermal degradation without ethylene glycol addition, from 0.955 to 0.876. With the various ethylene glycol addition rates, the IV continued to drop from glycolysis. As expected, there was no statistical change in the CEG level from the no ethylene glycol addition cell. There was also no deterioration in the polymer color.

EXAMPLE 2

This trial was conducted on a production industrial filament spin-draw machine. An injection tube was made from ¼" tubing and a bushing and installed in the unused gas purge coupling in the feed throat of the extruder. A gear pump with a variable speed drive was used to meter the ethylene glycol addition. The process response for extruder operation, polymer temperature, and polymer pressure in the melt throughout the manifold was monitored. The SSP chip IV was 0.955 with a CEG of 12 and fed to an extruder at a rate of 474.2 kg./hour. Table 2 shows the cells, ethylene glycol addition ratios and yarn property results.

TABLE 2

| Cell | Glycol/Polymer Ratio | IV | CEG |
|---|---|---|---|
| 1 | 0 | 0.891 | 21 |
| 2 | 0.0005 | 0.787 | 18.3 |
| 3 | 0.0008 | 0.731 | 18.3 |
| 4 | 0.0010 | 0.699 | 18.5 |
| 5 | 0.0012 | 0.672 | 17.8 |

Table 3 shows IV measured at the odd numbered stripper junctions of the spin beam manifold for the no ethylene glycol cell and cell 4. The standard deviation of the results was equal. CEG did not increase with the IV reduction and actually dropped slightly due to the lower polymer temperature exit the extruder.

TABLE 3

| Manifold Junction | IV | |
|---|---|---|
|  | Cell 1 | Cell 4 |
| 1 | 0.878 | 0.704 |
| 3 | 0.889 | 0.700 |
| 5 | 0.893 | 0.691 |
| 7 | 0.887 | 0.702 |
| Avg | 0.887 | 0.699 |
| Std. Dev. | 0.0063 | 0.0061 |
| Range | 0.015 | 0.014 |

Thus it has been apparent that there has been provided, in accordance with the invention, a process for the reduction of molecular weight that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

What is claimed is:

1. A method of reducing the molecular weight of a polyester resin suitable for spinning, comprising: obtaining solid stated polyester resin feed stock having an IV greater than about 0.8, introducing said polyester resin into an extruder, introducing ethylene glycol into said extruder to mix with said polyester resin, and spinning said resultant polyester resin in a spinning machine to produce fibers having an IV greater than 0.7.

2. The method of claim 1, wherein said ethylene glycol is present in stoichiometric amount for the required reduction in IV.

3. The method of claim 2, wherein said ethylene glycol is present in a ratio from about 0.0001 to about 0.001 ethylene glycol/polyester resin ratio.

4. The method of claim 1, wherein said fiber has no detectable degradation, other than the reduction in IV.

5. The method of claim 2, wherein said fiber has Hunter color properties about the same as said polyester resin produced without the addition of ethylene glycol.

6. The method of claim 1, wherein said fiber IV is measured at multiple positions of said spinning machine and the variability in IV is the same as the method without the addition of ethylene glycol.

7. The method of claim 6, wherein said variability is less than 0.01.

8. A method of lowering the molecular weight of polyester, comprising: obtaining solid stated polyester resin feed stock having an IV greater than about 0.8, introducing said polyester resin into an extruder, mixing ethylene glycol with said polyester in said extruder wherein said ethylene glycol is present in a stoichiometric amount, whereby said resultant polyester resin has an IV greater than 0.7.

9. The method of claim 8, further including the step of extruding said resultant polyester resin into an article.

10. The method of claim 9, wherein said article is a bottle preform.

11. The method of claim 8, wherein said ethylene glycol is present in a ratio from about 0.0001 to about 0.001 ethylene glycol/polyester resin.

12. The method of claim 9, wherein said article has no detectable degradation, other than the reduction in IV.

13. The method of claim 9, wherein said article has Hunter color properties about the same as said polyester resin produced without the addition of ethylene glycol.

* * * * *